United States Patent
Zlatnik (10) Patent No.: US 9,626,283 B1
(45) Date of Patent: Apr. 18, 2017

(54) SYSTEM AND METHOD FOR AUTOMATICALLY ASSIGNING A DEFECT TO A RESPONSIBLE PARTY

(71) Applicant: CA, Inc., Islandia, NY (US)

(72) Inventor: Pavel Zlatnik, Prague-Brevnov (CZ)

(73) Assignee: CA, Inc., New York, NY (US)

( * ) Notice: Subject to any disclaimer, the term of this patent is extended or adjusted under 35 U.S.C. 154(b) by 801 days.

(21) Appl. No.: 13/787,572

(22) Filed: Mar. 6, 2013

(51) Int. Cl.
 G06F 9/44 (2006.01)
 G06F 11/36 (2006.01)
 G06Q 10/06 (2012.01)

(52) U.S. Cl.
 CPC ......... *G06F 11/3668* (2013.01); *G06Q 10/06* (2013.01)

(58) Field of Classification Search
 CPC .................. G06F 11/3668; G06Q 10/06
 USPC ....................................... 717/124
 See application file for complete search history.

(56) References Cited

U.S. PATENT DOCUMENTS

| | | | | |
|---|---|---|---|---|
| 8,271,952 B2* | 9/2012 | Jain | ................. | G06F 17/30489 717/121 |
| 8,627,308 B2* | 1/2014 | DeLuca | ................. | G06F 8/30 709/206 |
| 8,832,659 B2* | 9/2014 | Ceze | ................. | G06F 8/314 717/124 |
| 8,972,954 B2* | 3/2015 | Brown | ................. | G06F 11/3636 717/131 |
| 2010/0211932 A1* | 8/2010 | Jones | ................. | G06F 11/3624 717/124 |
| 2015/0355998 A1* | 12/2015 | Kogan-Katz | ......... | G06F 11/366 717/101 |

FOREIGN PATENT DOCUMENTS

WO WO 2014120192 A1 * 8/2014 ............ G06F 11/366

OTHER PUBLICATIONS

Anvik et al, "Who Should Fix This Bug?", 2006.*
Cubranic et al, "Automatic Bug Triage Using Text Categorization", 2004.*
Nguyen et al, "Inferring Developer Expertise through Defect Analysis", 2012.*
An Automated Bug Triage Approach: A Concept Profile and Social Network Based Developer Recommendation—Tao Zhang and Byungjeong Lee; School of Computer Science, University of Seoul, Seoul, Korea—ICIC 2012, LNCS 7389, pp. 505-512, 2012—Springer-Verlag Berlin Heidelberg 2012.*

(Continued)

*Primary Examiner* — Francisco Aponte
(74) *Attorney, Agent, or Firm* — Coats & Bennett, PLLC (57) ABSTRACT

A computing device is provided that automatically assigns bugs or errors associated with an application program to one or more developers that are best suited to address the bug. The bugs may be detected either at runtime or during a build process. The assignment of a bug to any given developer is based on an analysis of the debug information contained in a log file generated for the application program, as well as the knowledge of which developers worked on the code particularly associated with the detected bug, and/or on the contents of a pre-defined list that associates developers with different parts of the application program.

16 Claims, 6 Drawing Sheets

(56) References Cited

OTHER PUBLICATIONS

DECOBA: Utilizing Developers Communities in Bug Assignment—Shadi Banitaan; Department of Mathematics, Computer Science and Software Engineering, University of Detroit Mercy, Detroit—Mamdouh Alenezi; Department of Computer Science North Dakota State University,Fargo, ND—2013 12th International Conference on Machine Learning and Applications.*

Assigning Bug Reports using a Vocabulary-Based Expertise Model of Developers—Dominique Matter, Adrian Kuhn, Oscar Nierstrasz—Software Composition Group University of Bern, Switzerland—2009 IEEE.*

* cited by examiner

SYSTEM AND METHOD FOR AUTOMATICALLY ASSIGNING A DEFECT TO A RESPONSIBLE PARTY

BACKGROUND

The present disclosure relates to computer systems, and more specifically, to systems and computer-implemented methods for assigning defects or bugs in software applications to a developer most appropriate to address and correct the defect.

Large software projects typically include the development of applications comprising many different types of files, such as source code and data files, for example. Generally, different software developers are responsible for different application functions, and thus, create and maintain their own files directed at performing or supporting those functions in a planned and structured development process. When completed, the different files are usually brought together in a build, for example, to create an executable application for distribution to end users.

During the development phase of the application, each developer can create and modify their particular files with little or no knowledge of the other developers or other parts of the application. However, during the build process, or even during runtime, errors can occur with the source code. When errors do occur, it is important to be able to quickly identify the developer or developers that are best suited to troubleshoot and/or correct the defect that caused the error. However, with so many different developers working on such diverse parts of an application, identifying the proper personnel to address an error is not always an easy and straightforward exercise.

BRIEF SUMMARY

The present disclosure provides a method and apparatus for automatically assigning bugs or errors associated with a software application to one or more developers that are best suited to address and/or correct the bug. Such bugs may, for example, be automatically detected either during a build process for the application, or during runtime of the application.

In both cases, a log file is generated that comprises debug information about an error or bug that is detected. The method and apparatus of the present disclosure analyzes log file and utilizes the information included in the log file, along with knowledge of which developers and development teams are responsible for which parts of the application, and generates a data set that specifies developers that are considered as candidates for addressing and/or correcting the error. From the data set, the method and apparatus selects a developer to be responsible for correcting the error and assigns the developer to the error.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, aspects of the present disclosure provide an apparatus and computer-implemented method for automatically assigning bugs detected in an application, either at runtime or during a build process, to one or more developers that are best suited to address the bug. The assignment of a bug to a given one or more developers may be based, for example, on an analysis of a log file generated by the application, as well as knowledge of which developers worked on the code particularly associated with the detected bug. With the present disclosure, the time needed to research and track a developer that is most appropriate to address and/or correct a detected bug is greatly reduced. So, too, is the complexity of the process of determining the appropriate developer or developers.

Figure 1:
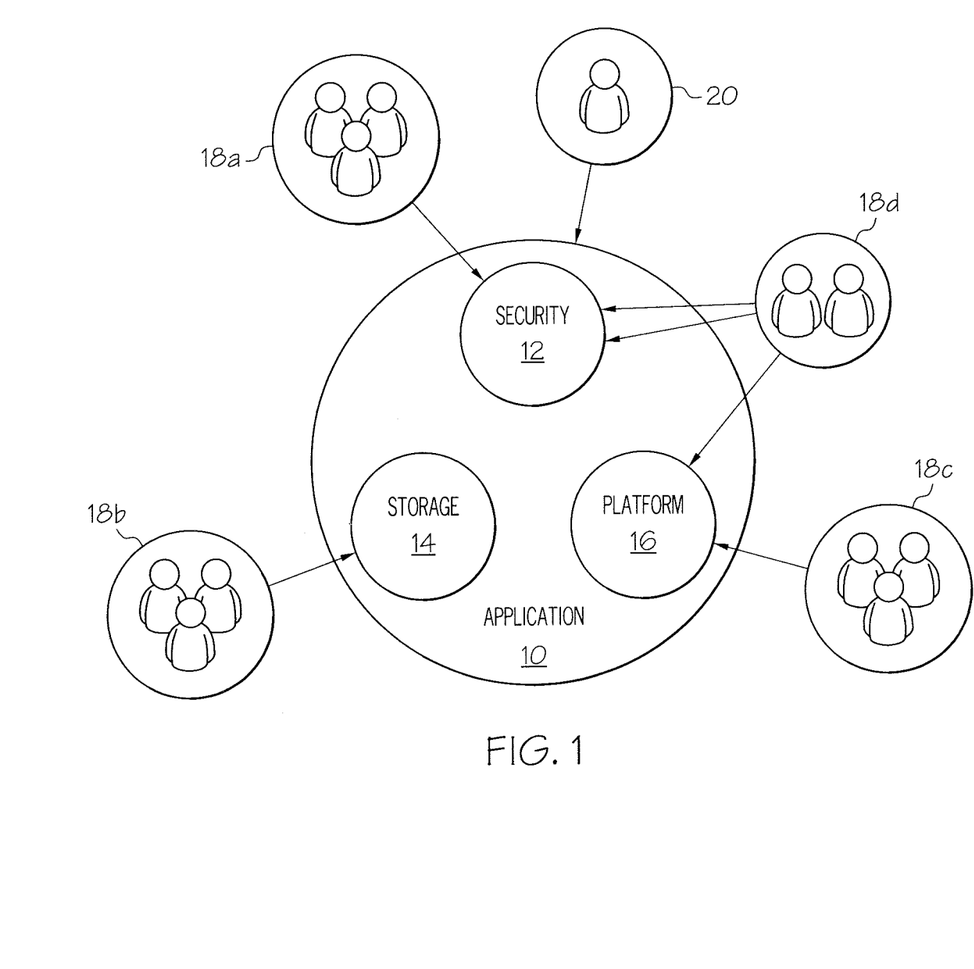
FIG. 1 is a block diagram illustrating an application and its components, as well as the relationships that may exist between the application and one or more developers responsible for developing and maintaining the application.

Referring now to the drawings, FIG. 1 is a block diagram illustrating a software application 10 and the relationship that may exist between the application 10 and one or more software developers 18a-18d and 20 responsible for creating and maintaining the application 10 throughout its lifecycle.

As seen in FIG. 1, application 10 is comprised of multiple software "packages" 12, 14, 16, each of which may be associated with a different set of functions. It is not important to the present disclosure the number of packages or the exact functions that are associated with the packages. However, for illustrative purposes only, the embodiment seen in FIG. 1 depicts three different packages. Particularly, a first package is a security package 12 that includes the code and/or data associated with the security functions of application 10. Such functions may include, but are not limited to, user login and access functions. A second package is a storage package 14 that includes the code and/or data to facilitate the storage functions of the application, such as writing and reading data and information to and from a memory associated with a device executing application 10. A third package is a platform package 16. The platform package 16 includes the code and/or data required to operate base platform services on a device, as well as the code and/or data needed to allow the platform package 16 to communicate data and information with the other packages 12, 14. As those of ordinary skill in the art will readily appreciate, the present disclosure is in no way limited to these particular functions, and other packages and functions are also possible.

As seen in more detail later, each of these packages 12, 14, 16 may comprise one or more different files or different versions of the same file(s). Such files may include, by way of example only, source code files (e.g., .c, .cpp, .h, script files, etc.), object files, executable files, data files, image files, video files, and any other file that the application 10 utilizes to perform its functions. Different entities may organize and assign their developers to various parts or portions of the application 10 using different methodologies. However, as seen in the embodiment of FIG. 1, developers may be organized into a plurality of independent development teams 18a-18d. Each team 18a-18d would have one or more developers responsible for the code and/or data included in at least one package 12, 14, 16. In some cases, one or more developers in any single given team may be responsible for the code and data in more than one package (e.g., the developers in team 18d). The lead developer 20 is a developer whose role is to oversee the development teams' 18a-18d progress during the lifecycle of application 10.

As described in more detail later, any of the developers in the development teams 18a-18d, as well as the lead developer 20, may be called upon to address and correct a bug or error, or other defect in the application 10. Further, it is generally most efficient to assign the developer or developers that are most familiar with the code to address and correct a detected bug. However, although possible, there is no requirement that any one developer be aware of the code and/or data in any given package other than his/her own. In fact, in instances where application 10 is a large, complicated application comprising many different packages and files, it is likely that any given developer will not be familiar with the code and/or data contained in any of the other packages. Therefore, it can be difficult to locate an appropriate developer having specific knowledge of the package 12, 14, 16 in which a bug is detected. In turn, time and resources are wasted on determining which of the plurality of developers should be assigned to research and correct a bug that is detected either during a build of the application 10 on a computing device, or during runtime of the application 10 on a computing device.

Figure 2:
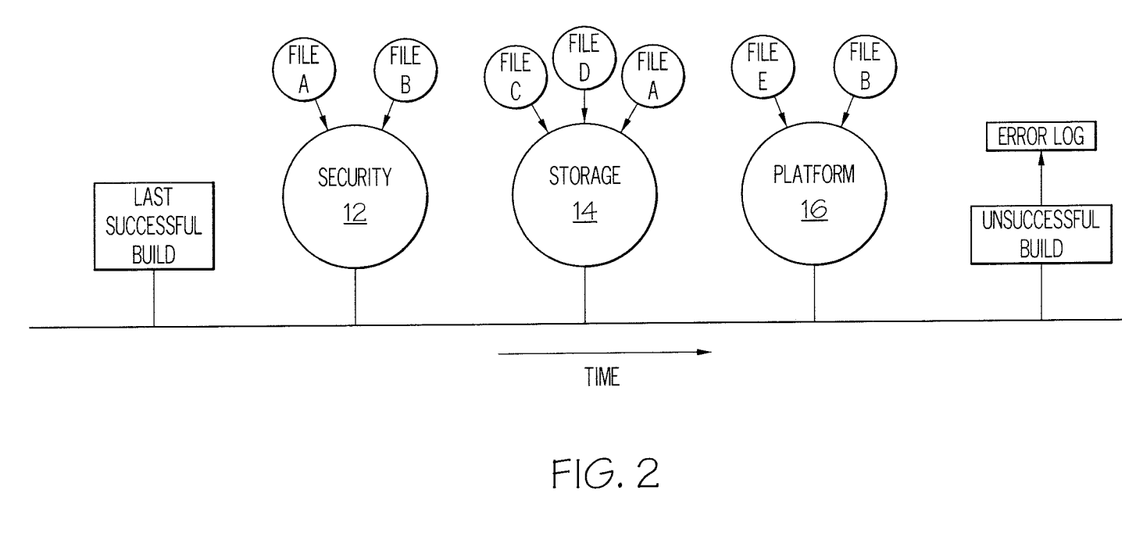
FIG. 2 is a timeline illustrating a build of an application according to one embodiment of the present disclosure.

FIG. 2 is a timeline of a build process illustrating how an appropriate developer 18a-18d may be assigned to address and/or correct a bug or other defect according to one aspect of present disclosure.

As previously stated, each package 12, 14, 16 includes one or more files labeled in FIG. 2 as FILE A . . . FILE E. The files, may include any number and type of source code file, for example, that contains the code (e.g., classes) and/or data necessary for performing an associated function. Further, different files are not constrained to only one package. Rather, different files, and thus, their associated code and/or data, may be utilized in more than one package. By way of example, the security package 12 includes two different files—FILE A and FILE B. Each of these files also appears in the storage package 14 (i.e., FILE A) as well as the platform package 16 (i.e., FILE B). Thus, each of the packages 12, 14, 16 can contain the same code and perform the same functions. The storage platform 14 contains two other files—FILE C and FILE D—that appear only in the storage package 14, while the platform package 16 contains an additional file (i.e., FILE E) that appears only in the platform package 16. In these cases, only those functions associated with the files can be performed by these packages 14, 16.

Periodically, all the packages 12, 14, 16 are brought together and undergo a software build process in which the source code in the packages 12, 14, 16 is processed and converted into executable code (i.e., application 10). There are many known processes for performing such builds; however, in one aspect of the present disclosure, the packages 12, 14, 16 are compiled into an executable application utilizing any of a plurality of well-known compilers.

Generally, if they occur, a compiler or other software application will detect errors during the build process. When an error is detected, the compiler or other application building the packages 12, 14, 16 will output information indicating the error to an error log file. The error log file can contain any type of information needed or desired, but in one embodiment, the error log file is a text file having multiple lines text identifying the date and time a given error occurred, the particular package having the source code associated with the error, the specific file, class, and line number of source code that caused the error, and a predetermined error code identifying the error and/or a short text description of the error. For example, the following line of text may be output to the error log to identify a BAD_OPERAND error detected on line 33 of the source file named "Access.cpp" during the build that occurred on Nov. 9, 2012. [11/9/2012 16:54:33 Security Package Access.cpp Class: Access line:33 Code:432 BAD_OPERAND]
Of course, this line of text is included only for illustrative purposes. As those skilled in the art will appreciate, more or less information may be included in the error log file, and further, may be arranged in any manner known in the art.

As previously stated, conventional means of assigning a developer to correct the detected error or bug in the application is inefficient. More particularly, it requires a person to manually sift through the error log file(s), which in most cases are numerous and very lengthy, to identify the particular error(s) that occurred. Once identified, the person reviewing the error log has to determine which of the many developers associated with the application 10 would be the best developer to analyze, research, address, and correct the detected bug. With the present disclosure, however, the computing device executing the build process is configured to automatically analyze the error log file to determine whether an error occurred during the build process, and then cross-match the particular package and/or file in which the error occurred to the appropriate one or more developers responsible for addressing and/or correcting the detected bug.

Figure 3:
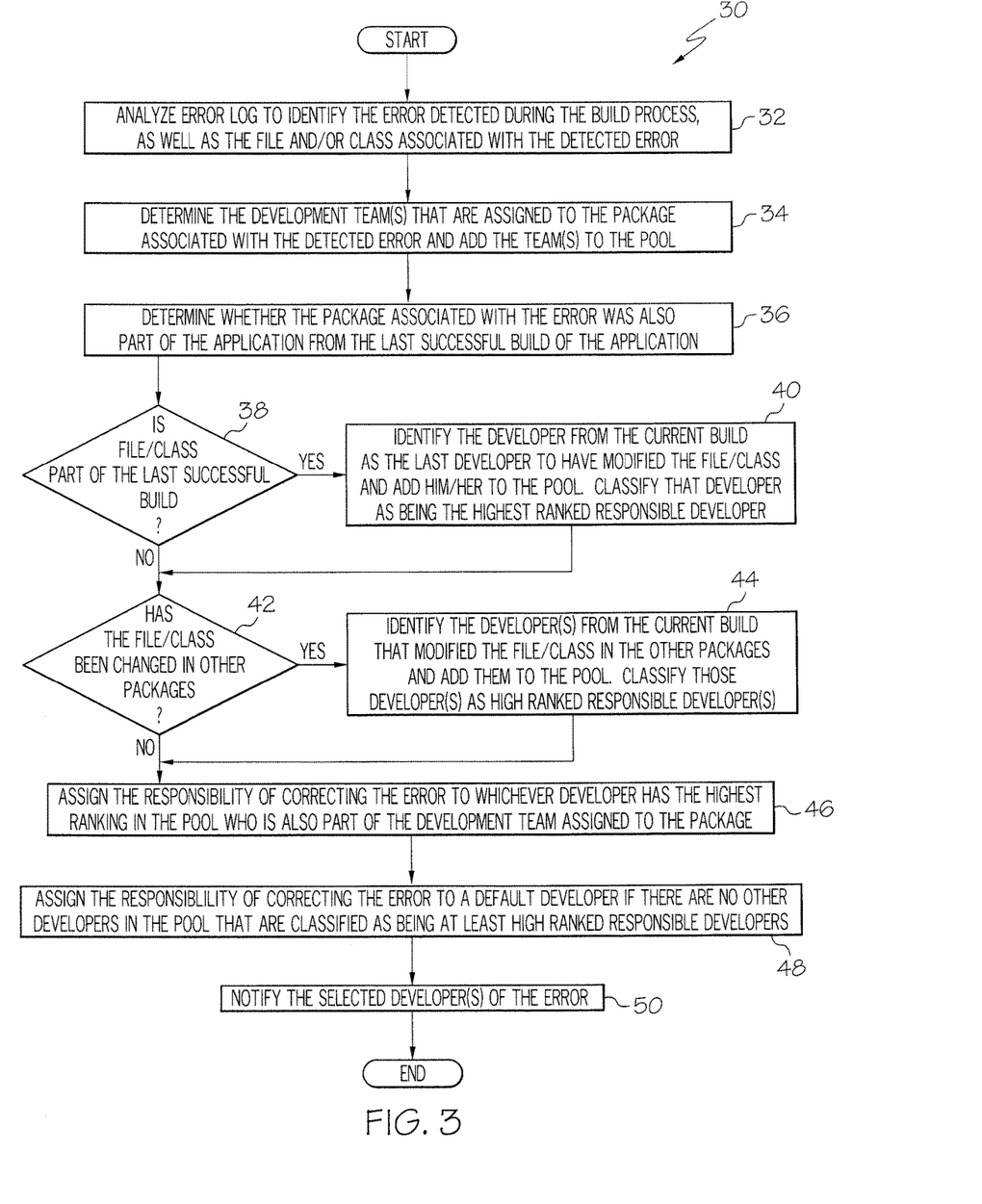
FIG. 3 is a flow chart illustrating a method of assigning a bug in the application, detected during a build of the application, to an appropriate developer according to one embodiment of the present disclosure.

FIG. 3 is a flow chart that illustrates one possible method 30 for generating a data set or "pool" of one or more developers that are to be considered best suited to address and/or correct an error detected during a build process. The method 30 first classifies the developer(s) in the data set and then selects a developer or developers from the data set as being the best suited to address and correct the detected bug. The method then assigns those selected developer(s) to the error. For clarity, FIG. 3 assumes that the build process has already been executed, and that the application performing the build has output an error log containing debug information identifying the error as previously described.

As seen in FIG. 3, the computing device performing method 30 first analyzes the error log to identify the particular error detected during the build process, as well as the file or class having the source code that contains the error (box 32). This information may be obtained, for example, by parsing the debug information in the error log file to detect predefined key words or indicators (e.g., error codes), and then extracting the information from the lines of text in the error log that contain the detected error codes.

The device will then begin to generate the data set specifying the developers. Particularly, the device first determines which development team 18a-18d, if any, is assigned to the file or class associated with the error and adds the identities of those teams to the data set (box 34). As seen later, the identity of the development team(s) may be obtained from a database, for example, that associates each package, file in the package, and/or class within the file, with one or more of the development teams 18a-18d, or in some aspects, one or more particular developers. Such information may be automatically added to, removed from, and maintained in the database, whenever a developer checks code into and out of a common repository that stores the code, for example.

With any given bug or error detected during the build process, the developer that last modified the code producing or associated with the error is very likely to be the most knowledgeable developer to address and correct the error. Thus, according to one or more aspects of the present disclosure, the computing device executing the build process is configured to check the contents of the last successful build of the application to determine whether the package associated with the detected error was also part of the last build. If so, the device checks to determine whether that version of the package (i.e., from the last build) also contained the file or class associated with the detected error (box 36). If so (box 38), then the device determines that the developer associated with the current build is the last developer to have modified the file or class associated with the error, identifies that developer using the information stored in the database as previously stated, and adds an identifier associated with the developer to the data set or "pool" of developers. Further, because that particular developer was the last to have modified the file or class, he/she is considered to be the most knowledgeable or appropriate developer to address and correct the detected error. Therefore, according to one or more embodiments, that developer is also classified within the data set or "pool" as being the highest ranked responsible developer (box 40).

Additionally, any given file or class may also be utilized in other packages and/or modified by other developers. By way of example, files or classes having code common to more than one package may be part of multiple packages, which in turn, may be assigned to different developers. Therefore, the computing device performing the build will also check the other packages in the current build to determine whether the file or class associated with the error is used in at least one other package. If so, the device checks whether other developers modified the file or class since the last successful build (box 42). If the computing device determines that one or more other developers also modified the file or class, the computing device will identify those developers from the database as being knowledgeable developers to which the bug may be assigned and add their identities to the data set of developers (box 44).

Once the data set of developers has been identified and the developers classified as being either a highest ranked or a high ranked responsible developer, the computing device performing the build process assigns the responsibility of addressing and correcting the detected error or bug to one or more developers identified in the data set. The method considers different techniques for performing this function. For example, in one embodiment, the device performing the build process simply assigns the error or bug to whichever developer in the data set is indicated as being the highest ranked responsible developer. In another embodiment, the device assigns the error or bug to whichever developer was the last developer to have modified the package, file, or class. In other embodiments, the error or bug is assigned to an entire development team or a group of developers. In this embodiment, however, the device assigns the error or bug detected during the build process to a developer identified in the data set that is the highest ranked responsible developer who is also on the development team 18a-18d associated with the particular package associated with the error (box 46).

In some cases, there may be conflicts as to which developer is the best suited to address and correct the detected error. For example, analysis of the information contained in the error log may reveal that more than one developer from the same development team modified the file or class causing the detected error since the last successful build. In such cases, the computing device may simply assign the detected error to whichever developer was the last developer to modify the file or class within the identified package. Additionally, if for some reason the computing device cannot determine an appropriate developer for a given error, the computing device may simply assign the error to a default developer (e.g., lead developer 20 or some other specially designated developer), or to the entire development team associated with the specific package and/or file(s) that caused the error to occur (box 48).

Regardless of which developer or developers are assigned to address and correct the error, however, the computing device performing the build notifies the identified developer(s) via any means known in the art. For example, the device may automatically generate a bug report and email the report to:

The developer(s) classified as being the highest ranked responsible developer; or All developer(s) classified as being a high ranked developer within the data set; or The lead developer 20 responsible for the package having the code causing the error; or A predetermined team member designated to track all detected errors resulting from the build for the particular package; or All developers that are members of the development team responsible for the package; or A combination thereof.

Figure 4:
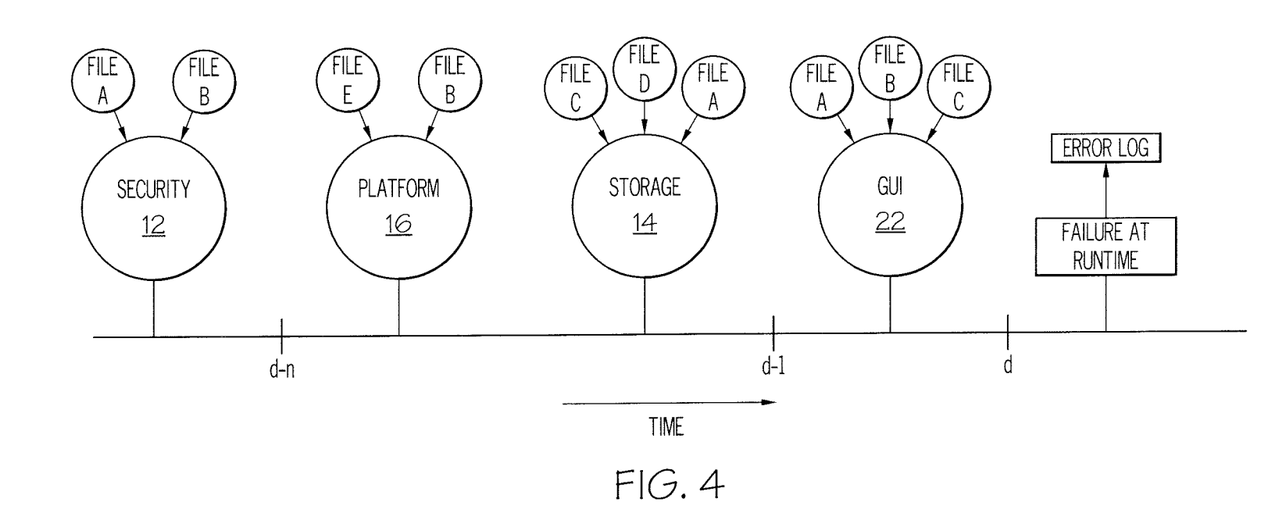
FIG. 4 is a timeline illustrating runtime of the application according to one embodiment of the present disclosure.
Figure 5:
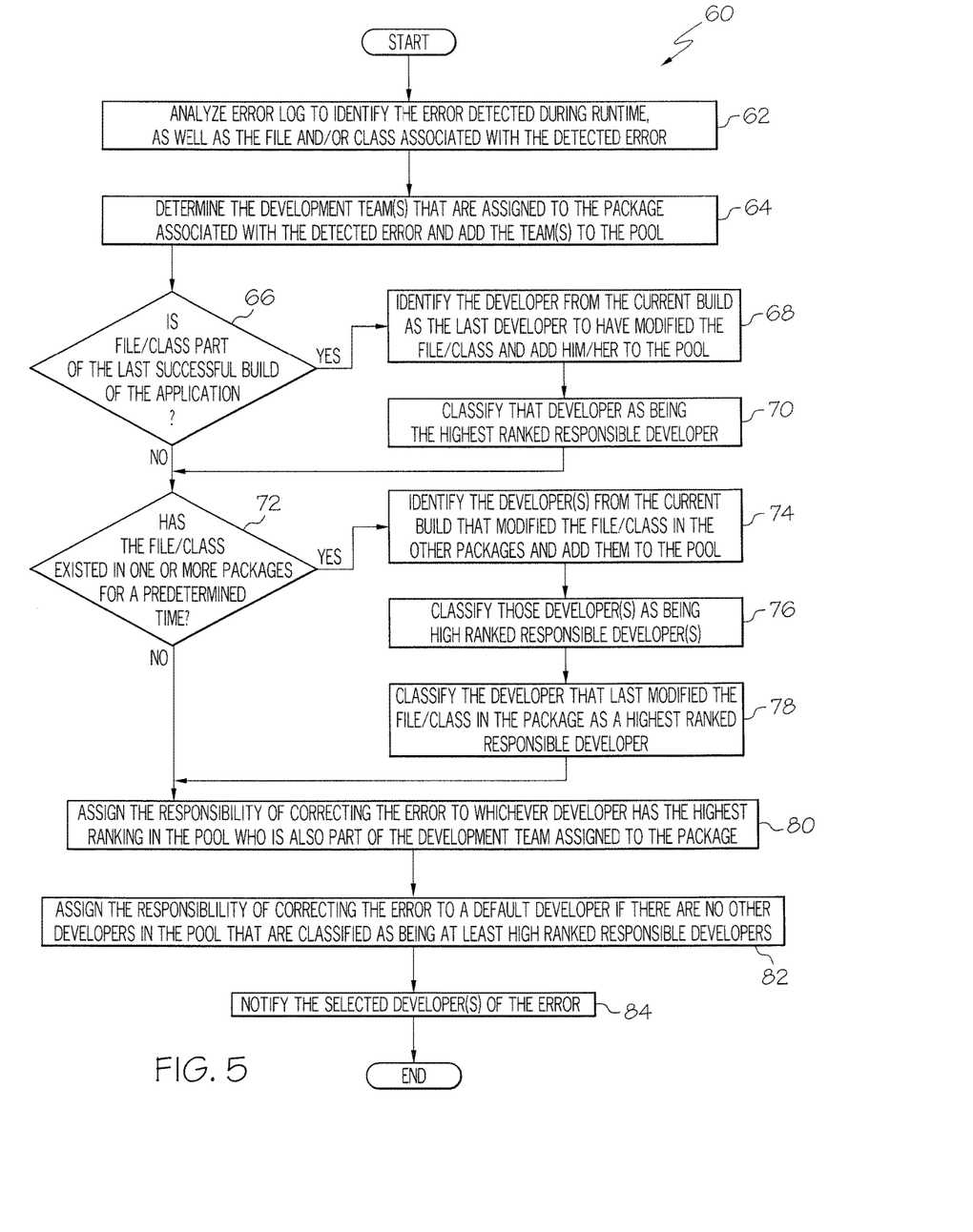
FIG. 5 is a flow chart illustrating a method of assigning a bug in the application, detected during runtime of the application, to an appropriate developer according to another embodiment of the present disclosure.

Although useful, the present disclosure is not limited only to use during a build process. Rather, as seen in FIGS. 4-5, for example, aspects of the present disclosure may also be utilized to assign an error or software defect to an appropriate developer where the error is detected during runtime of the application 10. FIG. 4, for example, depicts a timeline illustrating the runtime of the application 10 according to one embodiment of the present disclosure. Particularly, the timeline represents the execution of application 10 on a computing device over an arbitrary length of time (e.g., four weeks), and indicates changes were made to the specified packages 12, 14, 16, as well as when new packages, such as the Graphical User Interface (GUI) package 22, which includes FILE A, FILE B, and FILE C, were added to the application 10. The labels 'd,' 'd−1,' and 'd−n' indicate the current day (d), the previous day (d−1), and a day in the relatively distant past (d−n), such as three weeks, for example.

With the timeline of FIG. 4 in mind, FIG. 5 illustrates a method 60 by which a computing device configured according to one or more embodiments of the present disclosure detect and assign an error or defect in the software during runtime to one or more developers that are best suited to address and correct the detected error. As with the previous embodiments, method 60 assumes that the application 10 is running or has run on a computing device, and has output error information (e.g., debug information) to an error log (seen in FIG. 4) as previously described.

Method 60 begins with the computing device analyzing the error log to identify the particular error or errors that occurred during runtime of application 10, as well as the particular package, file, and/or class having the source code that caused the error (box 62). As previously stated, this may be performed by parsing the information in the error log and extracting predetermined information. The device then identifies the development team(s) 18a-18d, if any, that are assigned to the package containing the file/class and adds their corresponding identities to the data set or "pool", as previously described (box 64). The method 60 then determines which developer was the last developer to have modified the file or class associated with the detected error. Particularly, the device is configured to check an immediate prior build of application 10 to determine whether the file or class associated with the detected error was previously part of application 10 (box 66). For example, referring to the timeline of FIG. 4, if the computing device detected an error in FILE C during a run of application 10 on day d, the computing device would first check the GUI package 22 that was added to the application 10 the day before on day d−1. Information regarding which packages, files, and classes were included in previous builds of application 10 may be stored, and retrieved, from a database accessible by the computing device executing application 10.

If the file or class associated with the detected error existed in the immediately previous build of application 10

(box 66), the computing device utilizes the database previously described to identify the developer associated with the package containing the file or class that caused the error and adds the identity of that developer to the data set (box 68). The device also classifies the identified developer as being a highest ranked responsible developer (i.e., the developer best suited to address the error) (box 70).

The device executing the application 10 then checks one or more previous build versions of application 10 for a predetermined prior time period (e.g., 3 weeks) to determine whether the file or class (e.g., FILE C) also appeared in the packages of those builds as well (box 72). As stated above, this will help the device to identify other developers that may have modified the file, class, or package associated with the detected error. By way of example, consider a scenario wherein the device has detected an error in FILE C during runtime, and in which the predetermined time period d-n is three weeks. As stated above, the device would check the GUI package 22, and then check the storage and platform packages 14, 16 that were modified and added to the build on day d-n because they fall within the predetermined three week time period. However, the device would not check the security package 12 as that particular package was not added to the application 10 or modified within the predetermined time period.

The device next identifies the developer(s) that modified or added the files or classes in the other packages and adds their identities to the data set (box 74), and classifies each of these identified developers as being a high ranked responsible developer (box 76). Based on the developers identified in the data set, the device then classifies the developer who was last to modify the file or class as a highest ranked responsible developer (box 78), and assigns the detected error to the developer having the highest ranking and who is a member of the development team associated with the package (box 80).

As above, there may be conflicts as to which developer is the best suited to address and correct the detected error. In such cases, the computing device may assign the error to a default developer (e.g., lead developer 20), to the entire development team associated with the specific package and/or file(s) that caused the error to occur, or to some other developer (box 82). The device then notifies the responsible developer(s) as previously described (box 84).

Figure 6:
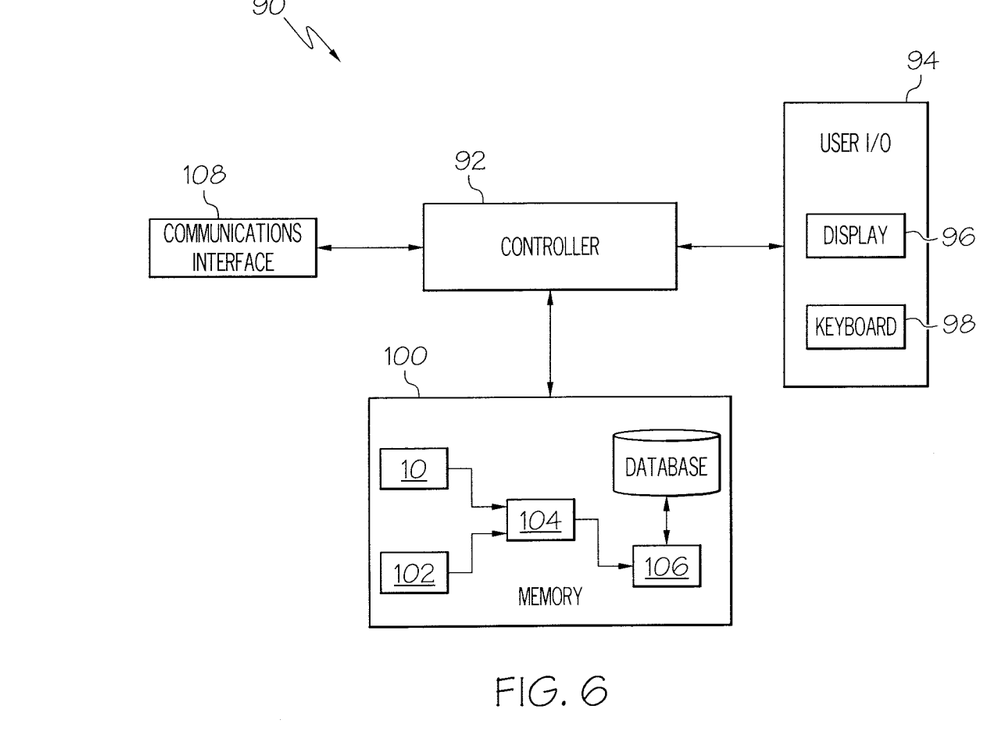
FIG. 6 is a block diagram illustrating some component parts of a computing device configured to assign an error occurring in an application to an appropriate developer responsible for addressing the error according to one or more embodiments of the present disclosure.

FIG. 6 is a block diagram illustrating some components of a computing device 90 configured to function in accordance with one or more aspects of the present disclosure. The device 90, which may comprise a workstation or server, for example, may be configured to perform the build process previously described, and/or execute the application 10 as previously described. However, in one or more aspects of the disclosure, the computing device 90 does not perform either the build process or the runtime execution of the application 10. Rather, in some embodiments, the computing device 90 is a workstation or server communicatively connected to a computer that receives or accesses the error log files generated by another computer that performs the build or execution of application 10. Regardless, however, computing device 90 is configured to automatically assign bugs or errors detected in application 10 to one or more developers that are best suited to address the bug or error based, for example, on the analysis of an error log file.

As seen in FIG. 6, the computing device 90 comprises a programmable controller 92, a user I/O interface 94, a memory 100, and a communications interlace 108. The programmable controller 92 may be implemented by one or more microprocessors, hardware, firmware, or a combination thereof, and generally controls the operation and functions of the computing device 90 according to the appropriate standards. Such operations and functions include, but are not limited to, communicating with network servers via a communications network (not shown), and implementing logic and instructions contained in a monitor application 106 stored in memory 100 to perform the method according to the embodiments as previously described.

The user I/O interface 94 provides the components necessary for a user to interact with the device 90. Such components include, but are not limited to, a display 96 and a keyboard 98 that allows a user to interact with application 10, as well as the monitor application 106 during the build and runtime processes. For example, the monitor application 106 may output certain information regarding the detected errors or bugs, as well as the identified developer(s) and team(s), to the display for the user.

The memory 100 may comprise any non-transitory, solid state memory or computer readable media known in the art. Suitable examples of such media include, but are not limited to, ROM, DRAM, Flash, or a device capable of reading computer-readable media, such as optical or magnetic media. The memory 100 stores programs and instructions, such as application 10, a compiler 102, and the monitor application 106 that may be executed by controller 92. The compiler 102, when executed by controller 92, compiles source code into application 10 and outputs an error log 104 to identify any errors that occur during the build process. The application 10, as stated previously, also outputs an error log file 104 to indicate errors or bugs that occur during runtime. The monitor application 106, when executed by device 90, causes the programmable controller 92 to automatically analyze the debug information contained in the error log 104 associated with the application 10, and to assign any bugs or errors detected from analyzing the debug information in the error log file 104 to one or more developers best suited to address the bug or error. As stated previously, the monitor application 106 may have access to a database (DB) that associates the different packages, files, and or classes that comprise application 10 to one or more developers or development teams. In operation, the monitor application 106 can access this DB to obtain information based on the data extracted from error log 104.

The communications interface 108 comprises a transceiver or other communications interface known in the art that facilitates the communications with one or more remote parties over a communications network. Such an interface may comprise, for example, an ETHERNET component capable of communicating data and information over a communications network as is known in the art. In one aspect, the controller 92, in accordance with the instructions in the monitor application 106, generates emails or other messages to one or more developers identified by the monitor application to inform them of their assignment to a given bug or error in application 10.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
    using a programmable processing circuit of a computer:
        retrieving a log file from a memory circuit comprising debug information generated for an application program, wherein the debug information is generated during a build of the application program, or during runtime of the application program, and indicates logic in the application program that caused an error;
        parsing the log file to obtain the debug information;
        generating, from a list of developers stored in a memory of the computer, a data set specifying developers associated with the error based on the debug information, wherein generating the data set comprises:
            determining whether the logic that caused the error was included in a plurality of files that are part of the application program; and
            if the logic that caused the error was included in a plurality of files:
                determining an identifier for each developer that modified at least one of the plurality of files comprising the logic; and
                adding each identifier for each developer to the data set;
        selecting, from the generated data set, a developer responsible for correcting the error based on the debug information; and
        assigning the selected developer to the error in the application program.

2. The method of claim 1 wherein generating, from a list of developers stored in a memory of the computer, a data set specifying developers associated with the error based on the debug information further comprises identifying a development team that is responsible for logic that caused the error, and adding an identifier associated with the development team members to the data set.

3. The method of claim 1 wherein generating, from a list of developers stored in a memory of the computer, a data set specifying developers associated with the error based on the debug information further comprises determining whether a file that comprises the logic was included in a prior successful build of the application.

4. The method of claim 3 wherein if a file that comprises the logic was included in a prior successful build of the application, then generating, from a list of developers stored in a memory of the computer, a data set specifying developers associated with the error based on the debug information further comprises:
    determining an identifier of the last developer to modify the file that comprises the logic; and
    adding the identifier to the data set.

5. The method of claim 1 wherein determining whether the logic that caused the error was included in a plurality of files comprises determining whether the logic has been included in at least one of the plurality of files for a predetermined period of time.

6. The method of claim 1 further comprising ranking each developer in the data set, and wherein assigning the selected developer to the error in the application comprises assigning the developer having the highest ranking among the developers in the data set to the error.

7. The method of claim 1 wherein assigning the selected developer to the error in the application comprises assigning the error to whichever developer last modified a file comprising the logic that caused the error.

8. A computing device comprising:
    a user Input/Output (I/O) interface configured to receive user input, and to provide output to the user;
    a memory configured to store a list of developers; and
    a programmable processing circuit configured to:
        retrieve a log file comprising debug information generated for an application program, wherein the debug information is generated during a build of the application program, or during runtime of the application program, and indicates logic in the application program that caused an error;
        parse the log file to obtain the debug information;
        generate, from the list of developers, a data set specifying developers associated with the error based on the debug information, wherein to generate the data set the processing circuit is configured to:
            determine whether the logic that caused the error was included in a plurality of files that are part of the application program; and
            if the logic that caused the error was included in a plurality of files:

identify each developer that has modified at least one of the plurality of files comprising the logic; and add an identifier for each developer to the data set;

selecting, from the data set, a developer responsible for correcting the error based on the debug information; and assign the selected developer to the error in the application program.

9. The computing device of claim 8 wherein the programmable processing circuit is configured to identify a development team that is responsible for logic that caused the error, and add an identifier associated with the development team members to the date set.

10. The computing device of claim 8 wherein the programmable processing circuit is further configured to determine whether a file that comprises the logic was included in a prior successful build of the application.

11. The computing device of claim 10 wherein if a file that comprises the logic was included in a prior successful build of the application, then the programmable processing circuit is further configured to:

determine an identifier of the last developer to modify the file that comprises the logic; and add the identifier to the data set.

12. The computing device of claim 8 wherein the programmable processing circuit is further configured to determine whether the logic has been included in at least one of the plurality of files for a predetermined period of time.

13. The computing device of claim 8 wherein the programmable processing circuit is further configured to rank each developer in the data set, and assign the developer having the highest ranking among the developers in the data set to the error.

14. The computing device of claim 8 wherein the programmable processing circuit is further configured to assign whichever developer last modified a file comprising the logic that caused the error to the error.

15. A computer program product comprising a non-transitory computer readable storage medium comprising computer readable program code embodied therewith, wherein when executed by a processing circuit of a computing device, the computer readable program code controls the processing circuit to:

retrieve a log file comprising debug information generated for an application program, wherein the debug information is generated during a build of the application program, or during runtime of the application program, and indicates logic in the application program that caused an error;

parse the log file to obtain the debug information;

generate, from a list of developers stored in a memory, a data set specifying developers associated with the error based on the debug information wherein to generate the data set the computer readable program code controls the processing circuit to:

determine whether the logic that caused the error was included in a plurality of files that are part of the application program; and if the logic that caused the error was included in a plurality of files:

identify each developer that has modified at least one of the plurality of files comprising the logic; and add an identifier for each developer to the data set;

select, from the data set, a developer responsible for correcting the error based on the debug information; and assign the selected developer to the error in the application program.

16. The computer program product of claim 15 wherein the computer readable program code further controls the processing circuit to rank each developer in the data set, and assign the error to the developer having the highest ranking among the developers in the data set.

\* \* \* \* \*